United States Patent
Miyagawa et al.

(10) Patent No.: US 6,707,775 B1
(45) Date of Patent: Mar. 16, 2004

(54) METHOD AND APPARATUS FOR MEASURING CROSSTALK OF OPTICAL DISC

(75) Inventors: Akira Miyagawa, Kanagawa (JP); Shuichi Fukuda, Tokyo (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

(21) Appl. No.: 09/568,847

(22) Filed: May 11, 2000

(30) Foreign Application Priority Data

May 13, 1999 (JP) ............................ P11-132990

(51) Int. Cl.7 .............................................. G11B 7/24
(52) U.S. Cl. ............................... 369/53.33; 369/47.17; 369/53.14
(58) Field of Search ........................... 369/53.33, 47.17, 369/53.14

(56) References Cited

U.S. PATENT DOCUMENTS

| | | | | |
|---|---|---|---|---|
| 4,866,687 A | * | 9/1989 | Kasai et al. ................... 369/32 |
| 5,615,205 A | * | 3/1997 | Belser ...................... 369/275.4 |
| 5,774,438 A | * | 6/1998 | Park et al. ...................... 369/54 |
| 6,069,870 A | * | 5/2000 | Maeda et al. ............. 369/275.4 |
| 6,233,208 B1 | * | 5/2001 | Sasaki ....................... 369/44.29 |
| 6,320,839 B1 | * | 11/2001 | Tobita et al. ............. 369/275.4 |
| 6,373,793 B1 | * | 4/2002 | Sasaki et al. .............. 369/30.1 |
| 6,373,816 B1 | * | 4/2002 | Kobayashi ............... 369/275.4 |
| 6,519,214 B1 | * | 2/2003 | Hikima .................... 369/44.26 |

* cited by examiner

*Primary Examiner*—Gautam R. Patel
(74) *Attorney, Agent, or Firm*—Jay H. Maioli

(57) ABSTRACT

A method and apparatus for measuring the crosstalk of an optical disc of an optical disc player adapted to reproduce signals recorded on the disc, in which there are concentrically or spirally formed continuous recorded signal strings or signal recording regions and in which there is provided a positioning aperture at the center of the disc substantially concentric with said recorded signal strings or signal recording regions. A light beam is wobbled at a predetermined amplitude in the direction along the radius of the optical disc. The wobbling period is set so as to be asynchronous with the period of the optical disc rotation. The ratio between the quantity of the traverse signal obtained by the optical pickup and the quantity of strays signals is measured as crosstalk.

5 Claims, 6 Drawing Sheets

METHOD AND APPARATUS FOR MEASURING CROSSTALK OF OPTICAL DISC

BACKGROUND OF THE INVENTION

1. Field of the Invention

This invention relates to a method and apparatus for measuring the crosstalk of an optical disc to evaluate the quality of the disc.

2. Description of Related Art

Among the items for evaluating the quality of optical discs, such as compact discs (trade mark) or mini-discs (trade mark) is a crosstalk which is used to evaluate the degree of signal deterioration by signal leakage from a neighboring track during reproduction of a specified track.

The crosstalk is defined as B/A, where A is the signal quantity of a specified track and B is the signal leakage from the neighboring track.

Among the methods for measuring the crosstalk of an optical disc, there are hitherto known a reverse tracking method and an off-tracking method.

The reverse-tracking method performs routine signal reproduction in a signal area under measurement to find the signal quantity A, and then reproduces signals between two signal strings in the same area under measurement to measure the stray signal quantity B to find the crosstalk B/A.

With such reverse tracking method, the playback signals are fairly stable and give relatively high repetition accuracy.

However, if the reverse tracking method is to be used, there is required a structure for reproducing signals between two signal strings. This structure is not provided in the usual player. With such reverse tracking method, only the stray signal quantity from a single side of the signal string can be measured, with the result that the measured results differ from the behavior of a real player.

On the other hand, the off-track method utilizes the phenomenon that changes in signal quantities from the signal string generated on disengaging a servo circuit used for following a track (the space lying directly above the track) and from the space between the signal strings (between two tracks) appear alternately. Specifically, the off-track method finds the signal quantity A from the signal string lying directly above the signal string and the stray signal quantity B from the signal quantity from the space between signal strings (space between two neighboring tracks) to find the cross-talk B/A.

With the off-track method, the measurement state can be regenerated by the function proper to the usual player, whilst the signal leakage from both sides of the signal strings can be evaluated which is similar to that encountered during normal reproduction.

However, the off-track method has an inconvenience that, since the difference between the signal quantity from the signal string lying directly above a given track and the signal quantity from the space lying between two neighboring signal tracks, this signal difference signal being called an HF traverse signal, is attributable to the eccentricity occurring at the time of manufacture of the optical disc or the eccentricity when mounting the optical disc on the optical player, which is the eccentricity ascribable to chucking, crosstalk measurement tends to be unstable.

Another inconvenience of the off-track method is that, since the trajectory of the light beam of the optical pickup on servo disengagement is at a predetermined distance from the center of rotation, the crosstalk can be measured only at limited portions of the optical disc, and that, should the optical pickup be set on the turntable in a different manner, the path followed by the light beam of the optical pickup is varied to change the measured values, rendering the measured values unstable.

Moreover, the off-track method has an inconvenience that, should the amount of eccentricity on mounting the optical disc on the player be small, the chance of the light beam of the optical pickup traversing the signal string (track) of the optical disc decreases, meaning that measurement only at limited portions of the optical disc lying on the light beam trajectory is used to represent the measurement for the entire area of the optical disc. In addition, should there be defects of the optical disc on the light beam trajectory, variations in crosstalk measurement undesirably tend to increase.

SUMMARY OF THE INVENTION

It is therefore an object of the present invention to provide a method and apparatus for measuring the crosstalk of an optical pickup in which the crosstalk of the optical disc can be measured with stability.

In one aspect, the present invention provides a method for measuring the crosstalk of an optical disc in which there are concentrically or spirally formed continuous recorded signal strings or signal recording regions and in which there is provided a positioning aperture at the center of the disc substantially concentrically with the recorded signal strings or signal recording regions. A light beam of an optical pickup of an optical disc player is wobbled at a pre-set amplitude along the radius of the optical disc, with the wobbling period asynchronous with respect to the rotational period of the optical disc. The ratio of the signal quantity of traverse signals obtained by the optical pickup and the signal quantity of the stray signals is measured as a crosstalk.

With the measurement method according to the present invention, in which, for measuring the crosstalk of the optical disc, the light beam of the optical pickup is wobbled at a predetermined amplitude in a radial direction of the optical disc, it is possible for the light beam to traverse e.g., 32 to 80 signal strings (tracks) per rotation of the optical disc to provide stable HF traverse signals. Moreover, since the wobbling period is adapted to be asynchronous with the period of rotation of the optical disc, the light beam has its trajectory changed from time to time without following the same trajectory to enable optimum crosstalk measurement over the entire width of the pre-set amplitude along the radius of the optical disc.

In another aspect, the present invention provides an apparatus for measuring the crosstalk of an optical disc in which there are concentrically or spirally formed continuous recorded signal strings or signal recording regions and in which there is provided a positioning aperture at the center of the disc substantially concentrically with the recorded signal strings or signal recording regions. The apparatus includes wobbling means for wobbling a light beam of an optical pickup of an optical disc player at a predetermined amplitude and at a period asynchronous with the period of rotation of the optical disc, in a radial direction of the optical disc, and calculating means for calculating the ratio of the signal quantity of traverse signals obtained by the optical pickup and the signal quantity of the stray signals as a crosstalk.

With the apparatus for measuring the crosstalk of the optical disc according to the present invention, in which the light beam of the optical pickup is wobbled a predetermined amplitude along the radius of the optical disc in measuring the crosstalk of the optical disc, 32 to 80 signal strings (tracks), for example, can be traversed by the light beam for each revolution of the optical disc, thus producing stable HF traverse signals. In addition, since the wobbling period is asynchronous with the period of disc rotation, the light beam of the optical pickup has its trajectory changed as time elapses, when the optical disc has made 10 complete revolutions, as an example, thus enabling optimum crosstalk measurement over the entire range of the predetermined amplitude along the radius of the optical disc.

DESCRIPTION OF THE PREFERRED EMBODIMENTS

Figure 1:
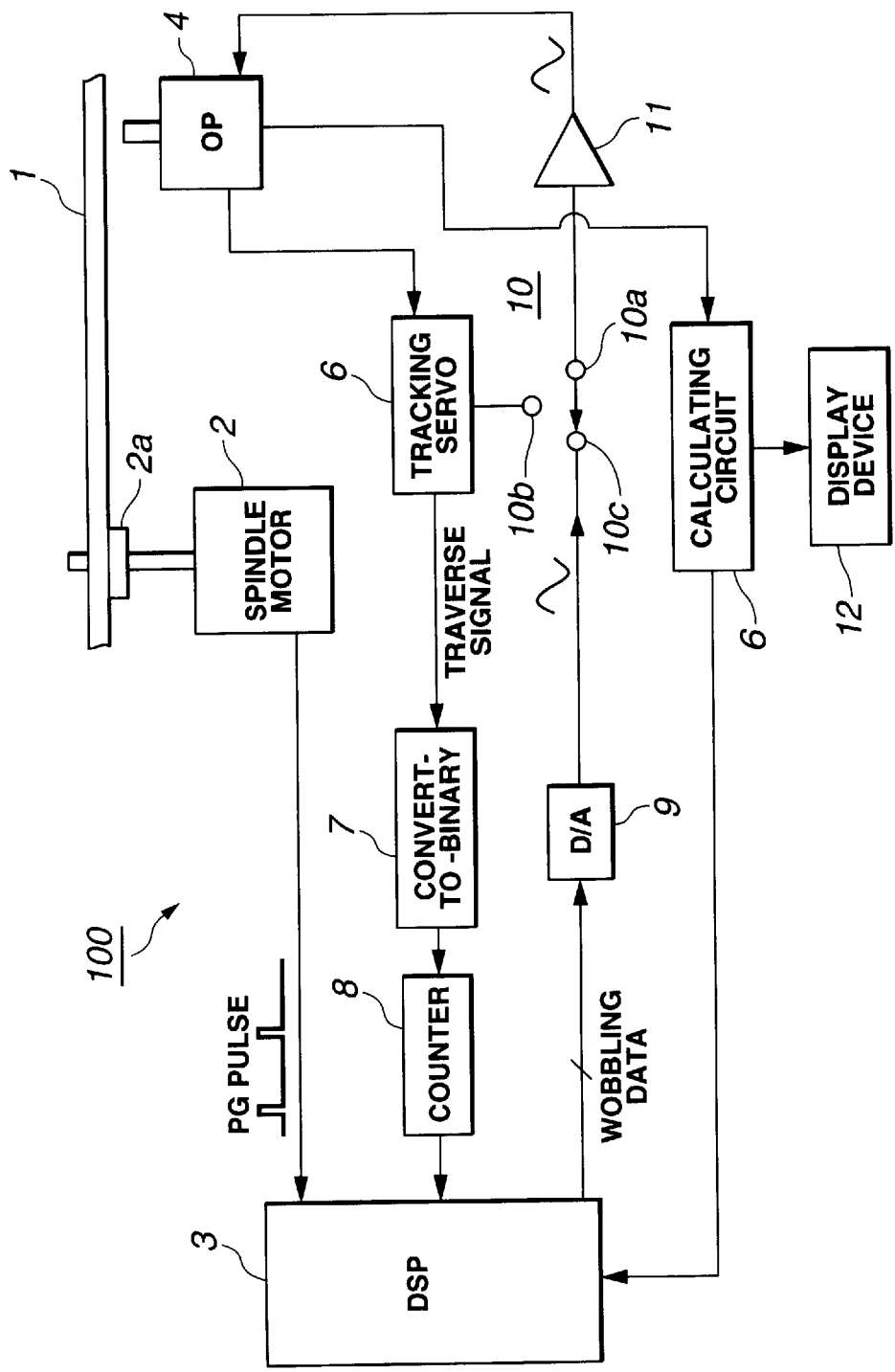
FIG. 1 is a schematic view showing an embodiment of a device for measuring the crosstalk of an optical disc embodying the present invention.
Figure 2:
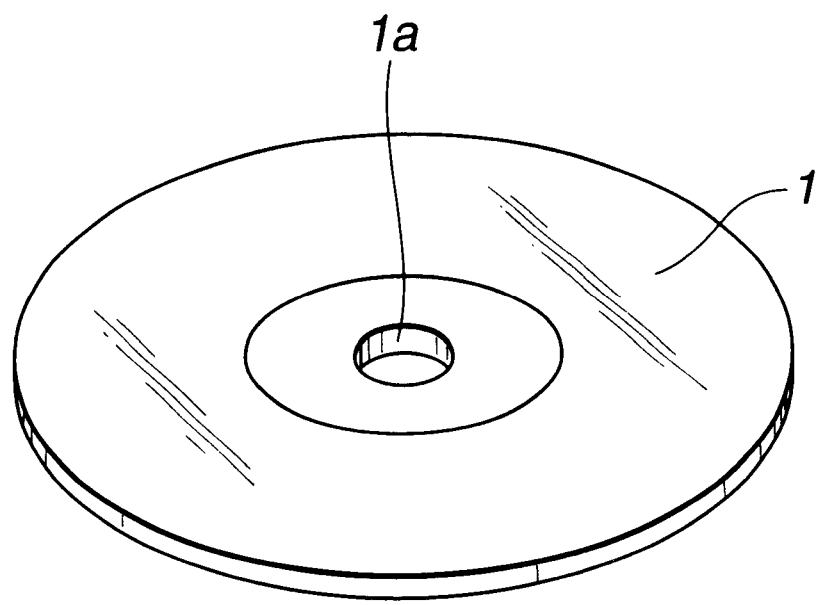
FIG. 2 is a perspective view showing an illustrative optical disc the crosstalk of which is measured by the measurement device shown in FIG. 1.

Referring to the drawings, preferred embodiments of the present invention will be explained in detail.

The present invention is applied to, for example, a measurement device 100 configured as shown in FIG. 1. This measurement device 100 measures the cross-talk of an optical disc 1, such as a compact disc (CD).

The CD 1 is adapted for reproducing the disc at a constant linear velocity. The CD 1 includes concentric tracks, as signal strings or signal recording areas, at a pitch of 1.6 μm, and a positioning aperture 1a substantially concentric with respect to the tracks.

Referring to FIG. 1, a spindle motor 2 is adapted for rotating the optical disc 1 at a constant linear velocity, along with a turntable 2a provided fixedly on its rotary shaft. The spindle motor 2 is adapted for producing a sole PG pulse per each revolution of the optical disc 1 to send the PG pulse to a digital signal processor (DSP) 3 as later explained.

Figure 3:
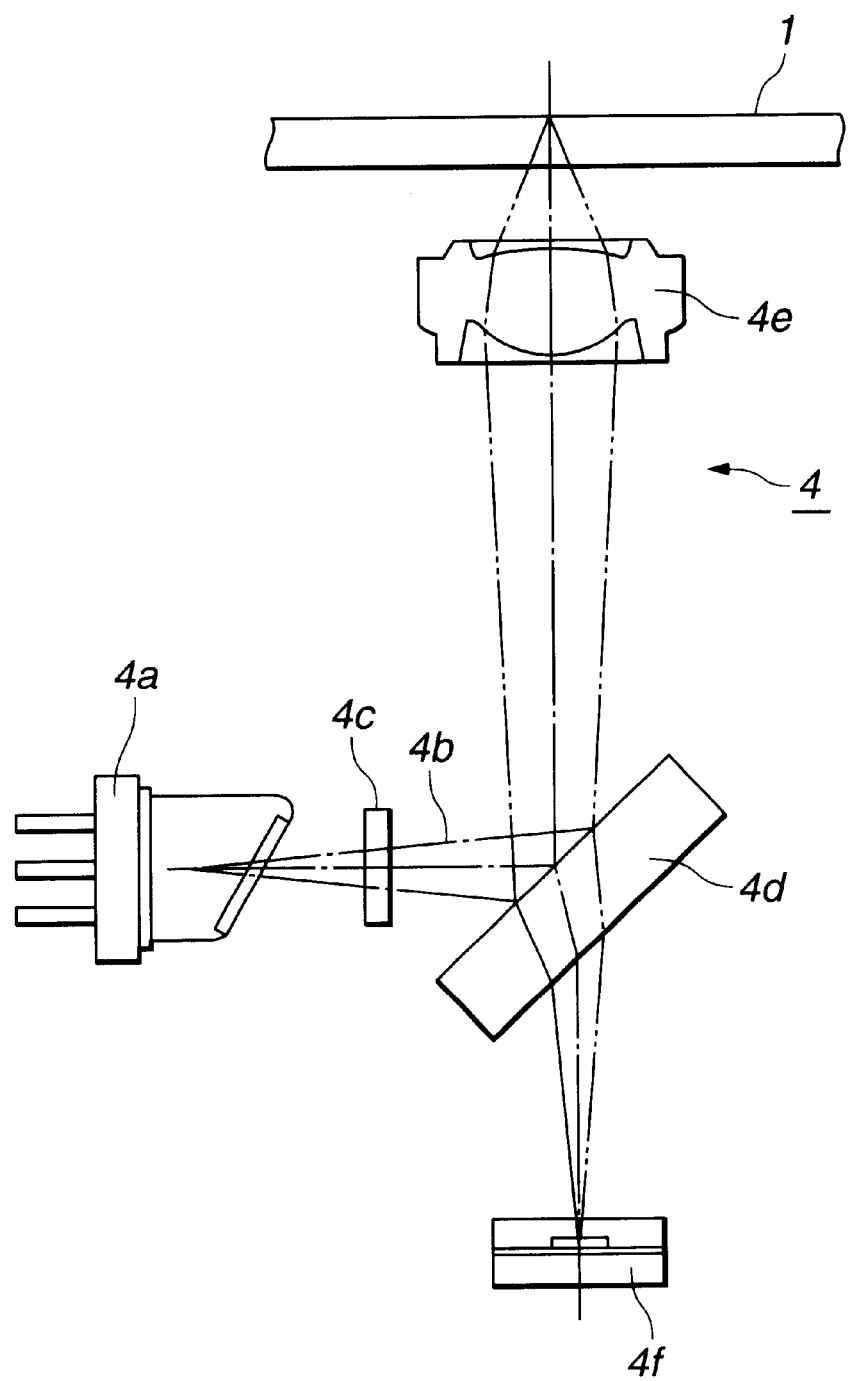
FIG. 3 is a schematic view showing an illustrative optical pickup in the measurement device of FIG. 1.
Figure 4:
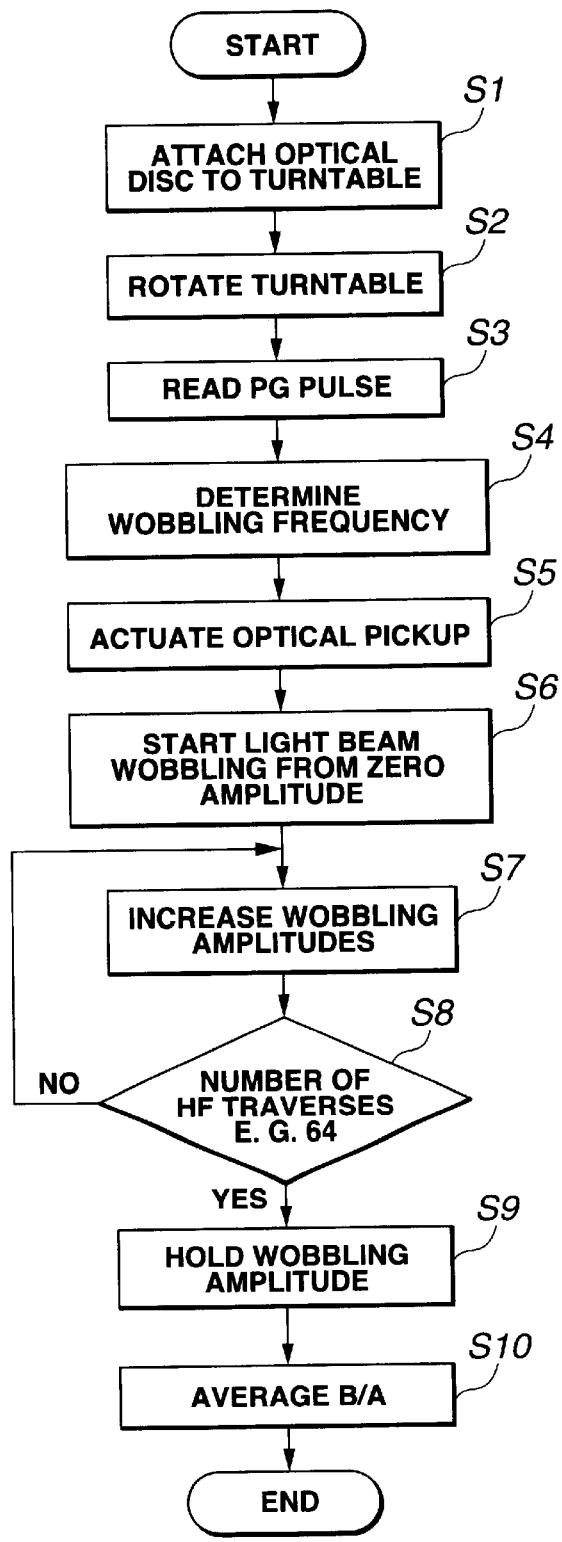
FIG. 4 is a flowchart showing the procedure of the measurement device.
Figure 5:
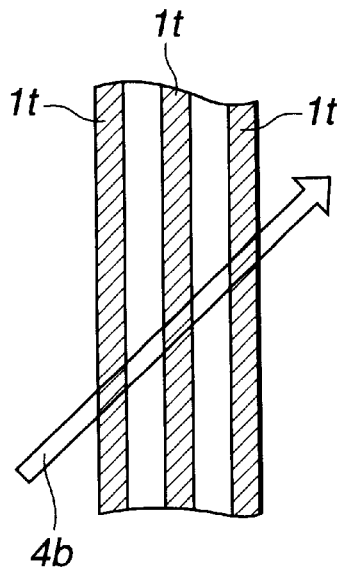
FIG. 5 is a schematic view showing the state in which a light beam of the optical pickup traverses a track of an optical disc.

As an optical pickup 4 for reproducing signals recorded on the optical disc 1, such as is shown for example in FIG. 3 is used. The optical disc 4, shown in FIG. 3, is configured for routing a light beam 4b from a laser diode 4a through a grating 4c to a beam splitter 4d and for illuminating the reflected light from the beam splitter 4d through an objective lens 4e to the optical disc 1. The optical pickup 4 is also configured for routing the reflected light (detection light) from the optical disc 1 through the objective lens 4e and the beam splitter 4d to a photodiode 4f constituting a detector.

The playback signals are sent by the optical pickup 4 to a calculating circuit 5 comprising a CPU. On the other hand, tracking error signals produced by the optical pickup 4 are routed to a tracking servo circuit 6.

When the tracking servo circuit 6 is disengaged, traverse signals traversing a track are obtained as tracking error signals. Output signals of a binary coding circuit 7, fed with traverse signals, are counted by a counter 8 to permit the amount of eccentricity of the optical disc 1 to be known based on the number of counts per revolution of the optical disc 1.

Specifically, the amount of offset can be obtained by multiplying the track pitch, such as 1.6 μm, with the number of counts per revolution of the optical disc 1 and by halving the resulting product.

Taking into account the PG pulse from the spindle motor 2, a digital signal processor 3 forms wobbling data of a sine wave of a frequency of the order of one-half to one-fourth the number of revolutions of the optical disc, asynchronous with the PG pulses, so that the total amplitude of the wobbling data will be 80 μm, as an example, in consideration of the amount of eccentricity of the optical disc 1.

In this case, since an amount of eccentricity of 70 μm is allowed for an optical disc player in consideration of the amount of eccentricity at the time of manufacture of the optical disc 1 and of the amount of eccentricity of the optical disc 1 occurring at the time of mounting thereof on an optical disc player (the amount of eccentricity produced due to chucking), the wobbling amplitude is set so as to be larger than this allowed amount of eccentricity.

In the present embodiment, the number of tracks which the light beam 4b of the optical pickup 4 traverses per revolution of the optical disc 4 is selected to be 32 to 80 in order to take the wobbling frequency and amplitude into account. Should the number of tracks traversed per revolution be less than 32 or larger than 80, there is a risk that optimum crosstalk measurement becomes infeasible.

Should the number of tracks traversed by a light beam of the optical pickup 4 per revolution of the optical disc 1 be a multiple of "8", such as, in particular, 64, it is possible to measure the crosstalk of each of eight of sectors obtained on equiangular division of the optical disc 1.

The wobbling data, produced by the digital signal processor (DSP) 3, is routed via a D/A converter circuit 9, converting digital signals into analog signals, to a fixed contact 10c on the disengaging side of a servo engaging/disengaging switch 10 adapted for switching between engagement and disengagement of the tracking servo. On the other hand, the output signal of a tracking servo circuit 6 is routed to a fixed contact 10b on the engaging side of the servo engaging/disengaging switch 10. A signal obtained at a movable contact 10a of the servo engaging/disengaging switch 10 is sent via a tracking drive circuit 11 to the optical pickup 4 to control the objective lens 4e and hence the trajectory of the light beam 4b. A display device 12 demonstrates the calculated results. Otherwise the configuration shown in FIG. 1 is formed similarly to that of a conventional optical disc player.

Figure 6:
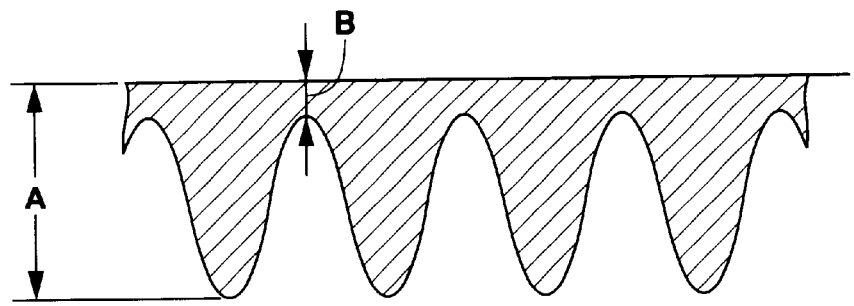
FIG. 6 shows HF traverse signals obtained by the optical pickup.
Figure 7:
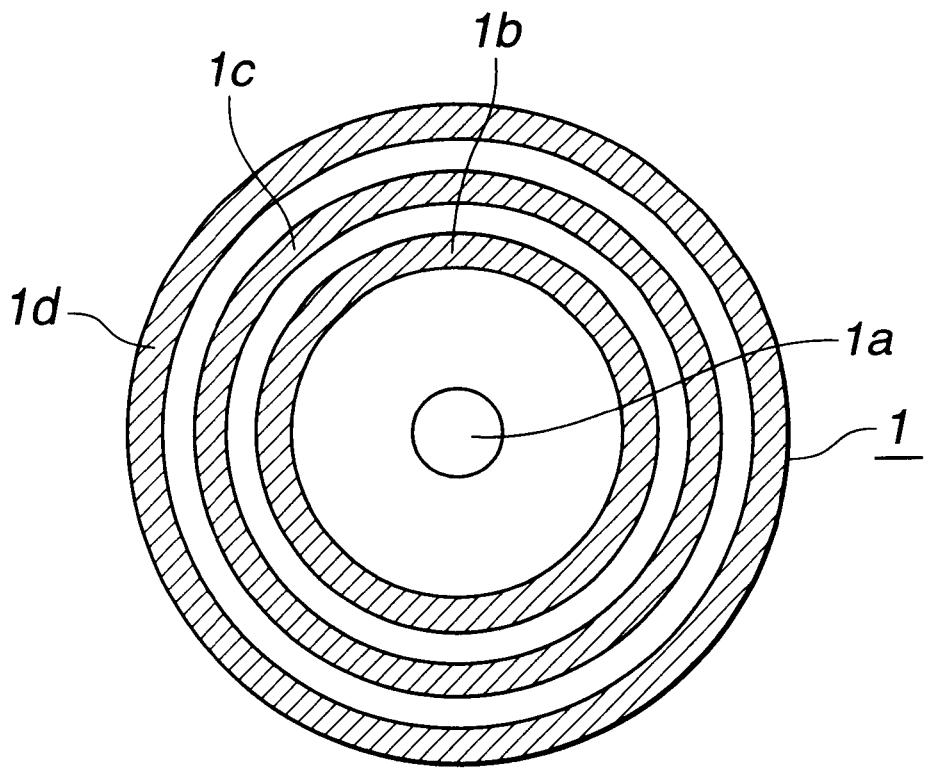
FIG. 7 shows exemplary measurement areas of an optical disc the cross-talk of which is measured by the measurement device.

The operation of crosstalk measurement is explained by referring to FIGS. 4 to 7. In the present embodiment, in measuring the crosstalk of the optical disc 1, the crosstalks of an inner rim area 1b, a mid area 1c and an outer rim area 1d are measured as shown in FIG. 7. The crosstalks at the inner rim area 1b, mid area 1c and at the outer rim area 1d are measured in similar manner. Alternatively, the crosstalk may also be measured over the entire areas of the optical disc 1.

In measuring the crosstalk of the optical disc 1, the movable contact 10a of the servo engaging/disengaging switch 10 is connected to the fixed contact 10c on the disengaging side to disengage the tracking servo. The optical disc 1 to be measured then is attached to a turntable 2a (step S1).

The spindle motor 2 then is actuated to run the optical disc 1 along with the turntable 2a in rotation (step S2). A PG pulse per rotation of the optical disc 1 is sent by the spindle motor 2 to the digital signal processor (DSP) 3 (step S3), which then determines the wobbling frequency of the sine wave asynchronous with respect to the PG pulse (step S4). The wobbling frequency is set to one-half to one-fourth of the rotational frequency of the optical disc 1.

The optical pickup 4 then is actuated (step S5), at the same time as the light beam starts to be wobbled with the above-mentioned wobbling frequency (step S6). This takes into account the amount of eccentricity at the time of manufacture of the optical disc 1 and the amount of eccentricity at the time of mounting the optical disc 1 on the turntable 2a.

The amplitude of the wobbling signals is increased (step S7), whilst it is verified by the CPU 5 at step S8 whether or not the number of times of crossing of the track by the optical disc 1 per revolution of the optical disc 1 is in the range of 32 to 80, for example, 64. The amplitude of the wobbling signals is increased until the number is equal to e.g., 64.

In this case, such an HF traverse signal, in which the signal quantity is equal to A each time a track (signal string or signal recording region) 1t of the optical disc 1 is traversed by the light beam 4b of the optical pickup 4, with the signal quantity between the tracks 1t and 1t being a stray signal quantity B, is obtained at the CPU 5.

When the number of times the light beam 4b crosses the track 1t during each revolution of the optical disc 1 is equal to, for example, 64, the amplitude of the wobbling signal is maintained (step Swollen-out portion 9) to measure the crosstalk (step S10).

In measuring the crosstalk (step S10), the value B/A is measured for each signal quantity A and each stray signal quantity B of the HF traverse signal shown in FIG. 6 and the values B/A for e.g. ten revolutions of the optical disc 1 are averaged and demonstrated as the crosstalk on the display device 12.

In the present embodiment, in which the light beam 4b of the optical pickup 4 is wobbled a pre-set amplitude along the radius of the optical disc 1 for measuring the cross-talk of the optical disc 1, it is possible for the light beam 4b to traverse e.g., 32 to 80, in particular 64, tracks 1t, during each complete revolution of the optical disc 1, thus achieving stable HF traverse signals and hence stable cross-talk measurement.

Also, in the present embodiment in which the wobbling period of the light beam 4b is asynchronous with the period of rotation of the optical disc 1, the light beam 4b of the optical pickup 4 has its trajectory changed from time to time, without passing through the same trajectory, when the optical disc is rotated a plurality of times, such as ten times, so that crosstalk can be measured optimally over a width of a pre-set amplitude along the radius of the optical disc 1, such as 80 μm.

According to the present invention, as described above, the light beam of the optical disc is wobbled a pre-set amplitude in the radial direction of the optical disc for measuring the cross-talk of the optical disc, so that e.g., 32 to 80 tracks, in particular 64 tracks (signals strings or signal recording regions) can be traversed during each complete revolution of the optical disc, with the result that stable HF traverse signals can be obtained to enable stable crosstalk measurement.

Also, in the present embodiment in which the wobbling period of the light beam is asynchronous with the period of rotation of the optical disc 1, the light beam of the optical pickup has its trajectory changed from time to time, without passing through the same trajectory, when the optical disc is rotated a plurality of times, such as ten times, so that crosstalk can be measured optimally over a width of a pre-set amplitude along the radius of the optical disc 1, such as 80 μm.

The present invention is not limited to the above-described embodiments such that a wide variety of different modification can be used without departing from the scope of the invention.

What is claimed is:

1. A method for measuring the crosstalk of a rotating optical disc in which there are concentrically or spirally formed continuous recorded signal strings or signal recording regions and in which there is provided a positioning aperture at the center of said optical disc substantially concentric with said recorded signal strings or said signal recording regions and in which a disc rotation speed changes as an optical pickup moves radially outwardly on said optical disc, the method comprising the steps of:

detecting a rotational period of said rotating optical disc;

wobbling a light beam of the optical pickup of an optical disc player at a predetermined amplitude along the radius of said optical disc, with a wobbling period being asynchronous relative to the detected rotational period of said optical disc; and measuring a ratio of a signal quantity of traverse signals obtained by said optical pickup and a signal quantity of stray signals, wherein the ratio represents the crosstalk.

2. The method for measuring the crosstalk of an optical disc according to claim 1, wherein said predetermined amplitude of wobbling of said light beam along the radius of said optical disc is increased or decreased depending on a degree of eccentricity of said optical disc.

3. The method for measuring the crosstalk of an optical disc according to claim 1, wherein a range of the number of signal strings or signal recording regions traversed by said light beam per complete revolution of said optical disc is 32 to 80.

4. An apparatus for measuring the crosstalk of a rotating optical disc in which there are concentrically or spirally formed continuous recorded signal strings or signal recording regions and in which there is provided a positioning aperture at the center of said optical disc substantially concentric with said recorded signal strings or said signal recording regions and in which a disc rotation speed changes as an optical pickup moves radially outwardly on said optical disc, the apparatus comprising:

means for detecting a period of rotation of said rotating optical disc;

wobbling means for wobbling a light beam of the optical pickup of an optical disc player at a predetermined amplitude and at a period asynchronous relative to the period of rotation of said optical disc detected by the means for detecting, along the radius of said optical disc; and calculating means for calculating a ratio of a signal quantity of traverse signals obtained by said optical pickup and a signal quantity of stray signals, wherein the ratio represents the crosstalk.

5. The apparatus for measuring the crosstalk of an optical disc according to claim 4, wherein
said wobbling means increases or decreases said predetermined amplitude of wobbling of said light beam along the radius of said optical disc depending on a degree of eccentricity of said optical disc.

* * * * *